UNITED STATES PATENT OFFICE.

GEORGE SCRIMSHAW, OF MILESBURG, PENNSYLVANIA.

COMPOSITION FOR PAVEMENTS, &c.

Specification forming part of Letters Patent No. 29,722, dated August 21, 1860.

*To all whom it may concern:*

Be it known that I, GEORGE SCRIMSHAW, in the borough of Milesburg, in the county of Centre and State of Pennsylvania, have discovered a new and useful Compound or Composition for Pavements and other Purposes; and I do hereby declare that the following is a full and exact description thereof.

The nature of my invention consists in the composition of iron cinder or broken stone, coal-ashes, coal-tar, and gravel to produce a solid and enduring material for paving, &c.

To enable others skilled in the art to make and use my composition, I will proceed to describe the ingredients and their proportions as I have used them.

I take broken stone, (or iron cinder, if stone cannot conveniently be had,) coal-ashes, and gravel. Of the stone or cinder and coal-ashes equal parts are required. I then temper it with coal-tar, or mix the tar thoroughly with the other ingredients until every particle of the composition is perfectly covered. After having laid the second coat of the composition, as hereinafter described, the gravel is then spread over the surface and stamped or rolled with a heavy metal or stone roller until perfectly smooth or until the composition has admitted of as much as possible.

In the laying of the composition it is necessary that there should be two coats. In the first one or foundation-coat the stone or cinder should be broken to about an inch and a quarter. In the second coat or finish the stone or cinder should be broken to about half an inch. The first coat should be stamped or rolled until pretty solid before applying the second coat or finish.

When the composition is used for sidewalks it is not necessary to lay it more than three inches in thickness. When used for streets, or where there is much heavy travel, it should be laid six inches in thickness.

A composition of this kind being laid in a solid piece will effectually turn all water, which is desirable in sidewalks to preserve the foundation of buildings along which it may be laid.

What I claim is—

The mixing of broken stone or cinder, coal-ashes, gravel, and coal-tar, in the proportions substantially as herein mentioned, for the purpose of forming a composition for pavement, as herein described and set forth.

GEORGE SCRIMSHAW.

Witnesses:
A. C. TONNER,
J. D. SHUGERT.